Aug. 26, 1930.  B. H. MARSHALL  1,773,917
MEANS FOR HANDLING AUTOMOBILE TRAFFIC
Filed May 23, 1929  2 Sheets-Sheet 2
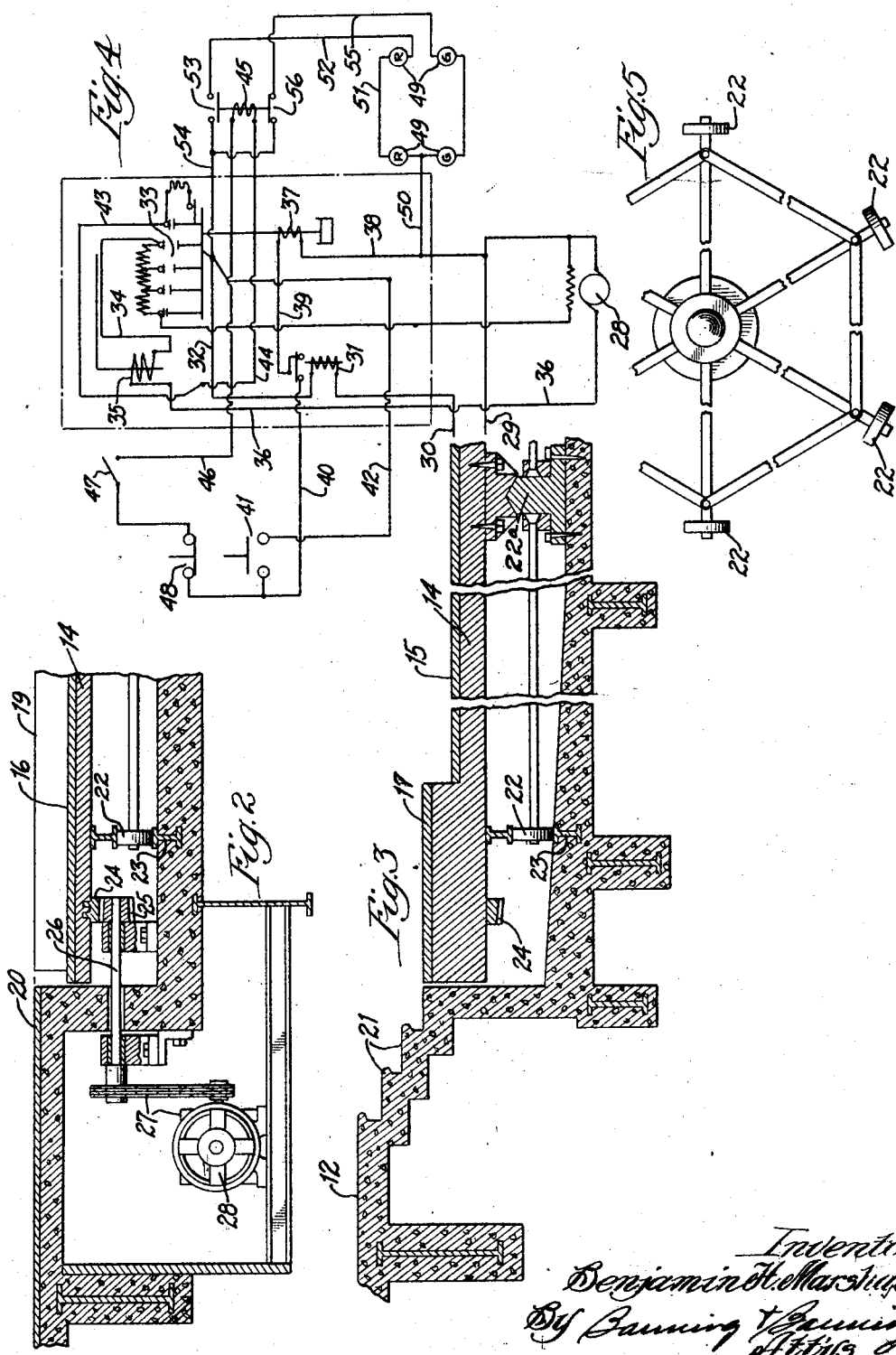

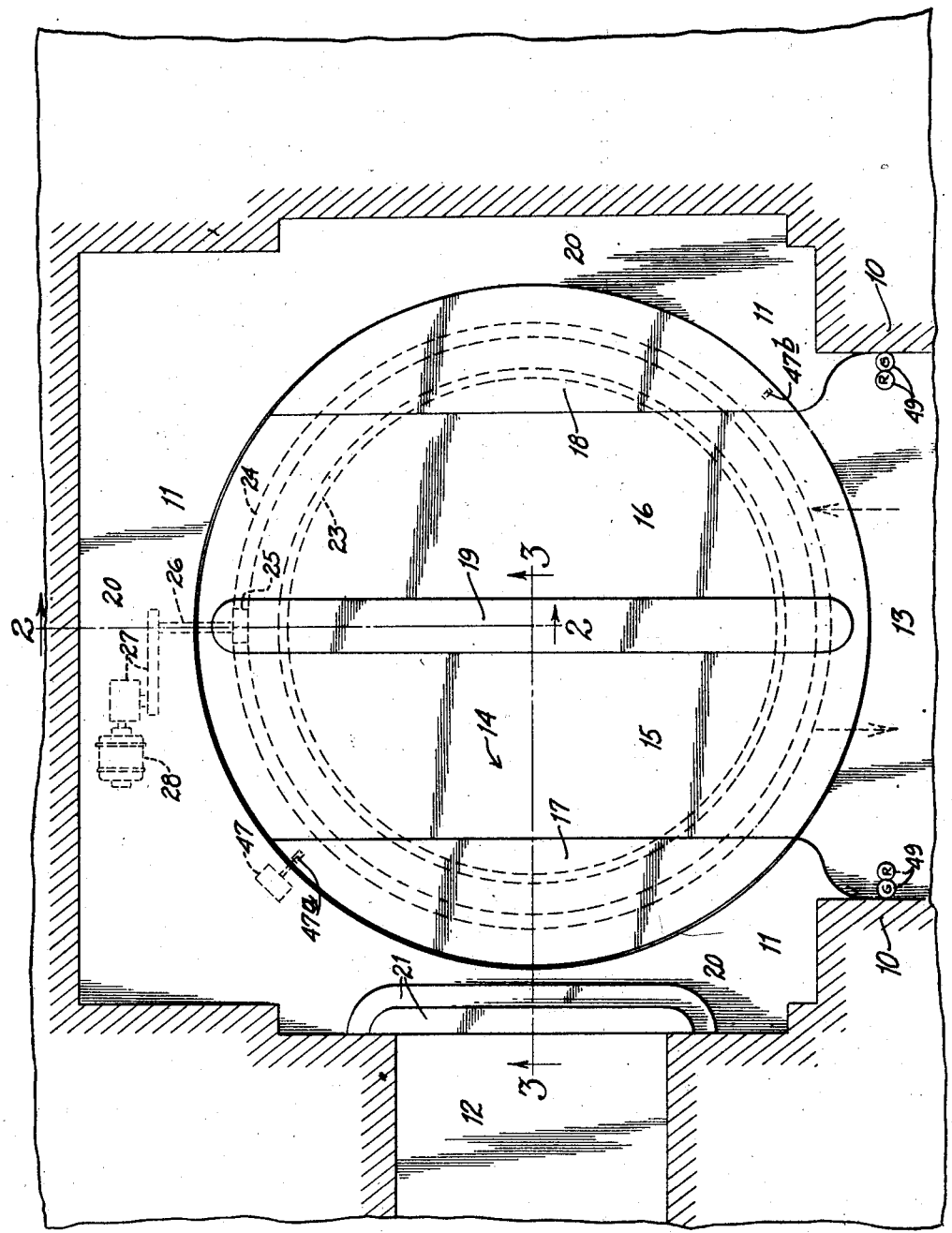

Patented Aug. 26, 1930

1,773,917

UNITED STATES PATENT OFFICE

BENJAMIN H. MARSHALL, OF WILMETTE, ILLINOIS, ASSIGNOR OF ONE-HALF TO SAMUEL M. HUNTER, OF CHICAGO, ILLINOIS

MEANS FOR HANDLING AUTOMOBILE TRAFFIC

Application filed May 23, 1929. Serial No. 365,550.

An object of this invention is to provide means for facilitating the handling of automobile traffic, and to provide improved means for loading and unloading automobiles at hotels, theaters, and the like.

This and other objects as will hereinafter appear are accomplished by this invention, which is fully described in the following specification and shown in the accompanying drawings, in which—

Figure 1 is a ground plan view of an entrance to a hotel or the like embodying the invention;

Fig. 2 is an enlarged partial section on the line 2—2 of Fig. 1;

Fig. 3 is a similar section on the line 3—3 of Fig. 1;

Fig. 4 is a wiring diagram of the electrical equipment; and

Fig. 5 is a partial plan view showing the roller mountings for the turntable.

The embodiment illustrated is shown as applied to a hotel or other public building having walls 10 which enclose an area 11 which communicates with the interior of the building through a passage 12, and which has an opening 13 through which automobiles may be driven from the street.

A turn table 14 is provided within this enclosed and protected area 11. The main central portion 15, 16, of the turn table is on a level with the entrance 13 but has two lateral raised lands 17, 18, which are disposed at opposite sides of the turn table, and a central partition member 19 is preferably used so as provide two compartments represented by the reference numerals 15, 16. The stationary floor 20 of the area 11 is at the same level as the lands 17, 18.

Thus it will be seen that an automobile driving into this enclosed area will stop on the portion 16 of the turn table following the arrow leading thereto, after which, as will later be described, the turn table is turned one-half a revolution, thereby presenting the right-hand doors of the automobile to the passage 12 so that the passengers may enter or leave the automobile at this point. It will also be seen that while one automobile is receiving or discharging passengers from the left-hand side of the turn table marked 15, another automobile will be entering the right-hand side marked 16. Before the turn table is turned the automobile at the left-hand side moves off the turn table, after which the turn table is again turned through one-half a revolution. The passage 12 may be on a level with the floor 20, or it may be approached by a set of ascending or descending steps 21.

The turn table 14 is mounted on a central pedestal 22ª and rolls upon wheels 22 which in turn roll upon rails, I-beams or the like 23.

A rack 24 is secured to the underside of the turn table 14, and this meshes with a pinion 25 which is carried upon a shaft 26 which is driven through a suitable reducing gearing 27 by an electric motor 28.

Referring now to the wiring diagram (Fig. 4) it will be seen that the electric motor 28 is connected at one side to the line 29, while the line 30 leads to the overload cutout 31, thence through the wire 32 to the automatic starter 33, thence through the lead 34 to the blowout 35, and thence through the lead 36 to the other side of the motor 28.

The starter 33 is under the control of an operator through a relay 37 which connects through a lead 38 to the main power line 29, while on the other side it connects through leads 39, 40, to the starting switch 41 which may be placed at any convenient point within the area 11 so as to be operable by an attendant. From the starting switch 41 current passes through the lead 42 to the lead 32.

Once the automatic starter 33 is closed it takes but a relatively small current to maintain it in this position, and this current flows through the lead 32, the leads 43, 44, the signal operating relay 45, the lead 46, the limit switch 47, the manual switch 48, the leads 40, 39, the relay 37, and the lead 38 to the main line 29.

The limit switch 47, as shown in Fig. 1, is located at the side of the turn table and is engaged by stops 47ª and 47ᵇ on the turn table. These correspond to the stopping positions of the turn table so that when these stops strike the limit switch 47 is opened, and current ceases to flow through the relay 37, thereby opening the automatic starter 33 and shutting off the motor.

It will sometimes be necessary to stop the motor at some intermediate point, and this is done by opening the stop or manual switch 48 which is preferably placed alongside the starting switch 41.

It is desirable that signal lights 49 be placed at the entrance 13 so as to indicate whether or not it is safe to drive in. Each of these consists of a red and a green light, the two red lights R being on leads 50, 51, 52, and thence through the relay switch 53, and through the lead 54 to the main lead 32 by which it connects with the line 30, the lead 50 being connected directly with the line 29. The green lights G are likewise in series circuit and are supplied with current through the leads 50, 55, and thence through the lower switch 56 of the relay 45 to the lead 54.

The relay 45 is controlled by the switches 47, 48. When either of these is open, as is now shown in Fig. 4, no current will be flowing through the relay 45, and consequently the switch 53 will be open while the switch 56 is closed, thereby causing the green lights G at the entrance to glow and indicating that the turn table is not in motion.

In using this invention an automobile to be loaded or unloaded drives on to the turn table at the right-hand side as indicated by the arrow, after which the operator presses the starting switch 41 which causes the motor 28 to turn the turntable through a half revolution, the turntable being brought to rest by the stop 47ª, striking the limit switch 47 thereby stopping the motor, as has been previously described. While passengers are then entering or leaving the vehicle and this vehicle drives off, another vehicle drives on the right-hand side of the turntable and the operator again presses the starting switch 41 setting the motor 28 in operation, and turning the turntable until the opposite stop 47ᵇ engages the limit switch 47.

Thus it will be seen that a very simple and effective means is provided for handling traffic to and from buildings.

An electric brake (not shown) is applied to the shaft of the motor 28 which begins to act to bring the motor to a stop the instant the current to the motor is broken.

While I have shown and described but a single embodiment of my invention, it is to be understood that it is capable of many modifications. Changes, therefore, in the construction and arrangement may be made which do not depart from the spirit and scope of my invention as disclosed by the appended claims.

I claim:

1. In combination with a loading platform of a building, a vehicular turntable having means adapted to register with said platform to form a portion thereof, and means for rotating said turntable to bring said means into registration with said platform, whereby an automobile may drive on said turntable adjacent said platform and be turned to reverse position away from said platform to drive away.

2. In combination, a building having an opening leading to a street adjacent the building and a loading platform within said opening, a turntable in said opening having lands normally registering with said platform, and means for turning said turntable through substantially one-half a revolution whereby an automobile may drive on said turntable adjacent said platform and be turned to reverse position away from said platform to drive out of the building.

3. In combination, a building having an opening leading to a street adjacent the building, a turntable in said opening, means for turning said turntable, the floor of the turntable being at the level of the opening entrance, the floor surrounding the other portions of the turntable being raised above the floor level of the turntable, and said turntable having oppositely disposed lands on a level with the surrounding floor.

4. In combination, a building having an opening leading to a street adjacent the building, a turntable in said opening, means for turning said turntable, the floor of the turntable being at the level of the opening entrance, the floor surrounding the other portions of the turntable being raised one step above the floor level of the turntable, and opposite lands on the turntable on a level with the surrounding floor.

5. In combination, a building having an opening leading to a street adjacent the building and a loading platform in said opening, a turntable in said opening adjacent said loading platform, and means for turning said turntable whereby an automobile may drive on said turntable adjacent said loading platform, be turned from said platform and drive out of the building.

6. In combination, a building having an opening leading to a street adjacent the building, a turntable in said opening, means for turning said turntable, the floor of the turntable being at the level of the opening entrance, the floor surrounding the other portions of the turntable being raised one step above the floor level of the turntable, opposite lands on the turntable on a level with the surrounding floor, and a central land on the turntable midway between the opposite lands.

7. In combination, a building having an opening leading to a street adjacent the building and a loading platform in said opening, a turntable in said opening and having a land adapted to register with said loading platform, means for turning said turntable to bring said land into registration with said loading platform whereby an automobile may drive on said turntable, be turned and drive out of the building, and a signal outside of said opening to indicate whether said turntable is at rest or in motion.

8. In combination, a building having an opening leading to a street adjacent the building, a turntable in said opening large enough to accommodate two automobiles side by side, means for turning said turntable through one-half a revolution whereby an automobile may drive on said turntable, be turned and drive out of the building, and means carried by the turntable for stopping said turntable when it has completed each one-half revolution.

In testimony whereof, I have hereunto set my hand this 30th day of March, 1929.

BENJAMIN H. MARSHALL.